United States Patent
Seino et al.

Patent Number: 6,055,349
Date of Patent: Apr. 25, 2000

[54] OPTICAL WAVEGUIDE DEVICE AND MANUFACTURING METHOD THEREFOR

[75] Inventors: Minoru Seino; Shinji Taniguchi, both of Kawasaki, Japan

[73] Assignee: Fujitsu, Ltd, Kawasaki, Japan

[21] Appl. No.: 09/116,593

[22] Filed: Jul. 16, 1998

[30] Foreign Application Priority Data

Jul. 28, 1997 [JP] Japan ................................. 9-201824

[51] Int. Cl.$^7$ ..................................................... G02B 6/26
[52] U.S. Cl. ........................ 385/50; 385/46; 385/47; 372/20; 372/99
[58] Field of Search ............................... 385/50, 46, 37, 385/31, 47, 48, 49; 372/20, 99

[56] References Cited

U.S. PATENT DOCUMENTS 5,396,507   3/1995   Kaminow et al. ...................... 372/20

OTHER PUBLICATIONS

"Postdeadline Papers", OFC '98, Optical Fiber Communication Conference, San Jose, California. No Month.

Primary Examiner—Phan T. H. Palmer
Attorney, Agent, or Firm—Staas & Halsey, LLP

[57] ABSTRACT

An optical device and manufacturing method therefor relate to a slab optical waveguide, a first optical waveguide, a plurality of second optical waveguides and a reflector. The slab optical waveguide has first and second ends. The first optical waveguide is optically connected to the first end of the slab optical waveguide. The plurality of second optical waveguides each have first and second guide bars with the first guide bars being optically connected to the second end of the slab optical waveguide and the second guide bars being optically connected to the first guide bars. The second guide bars may have a width greater than that of the first guide bars. The reflector is optically connected to each of the second guide bars of the second optical waveguides. The reflector may be formed on an end face on each of the second guide bars substantially perpendicular to an optical axis of the respective first guide bars. The first guide bars may have a refractive index temperature coefficient different in sign from that of the second guide bars. Instead of providing a guide bar for each second optical waveguide, a continuous polymeric block may substantially cover the end faces of all of the second optical waveguides.

34 Claims, 14 Drawing Sheets

OPTICAL WAVEGUIDE DEVICE AND MANUFACTURING METHOD THEREFOR

BACKGROUND OF THE INVENTION

1. Field of the Invention

The present invention relates generally to an optical device having an optical waveguide structure, and more particularly to an optical device and a manufacturing method therefor which device is suitably used as an optical multiplexer or an optical demultiplexer in a system adopting wavelength division multiplexing.

2. Description of the Related Art

In recent years, our advanced information society has began processing massive amounts of information. Optical fibers, which have a high transmission capacity, have been employed in communications/transmission networks. The transmission rate of information in optical fiber communications has already reached 2.4 Gb/s or 10 Gb/s. However, a further increase in transmission capacity will be necessary to enable a high quality video communication system that is expected to be put to practical use in the future. For example, a transmission capacity exceeding 1 terabit per second (Tb/s) will likely be necessary in a trunk system.

Wavelength division multiplexing (WDM) is one known technique for increasing transmission capacity in optical fiber communications. In a system adopting WDM, a plurality of optical carriers using different wavelengths are independently modulated to obtain a plurality of optical signals. The plurality of optical signals are wavelength division multiplexed by an optical multiplexer, and the resultant WDM optical signal is transmitted over an optical fiber transmission line. On a receiving side, the received WDM optical signals are separated according to wavelength into individual optical signals, by an optical demultiplexer. The individual optical signals are then demodulated to reproduce the transmitted data. Accordingly, by employing WDM, the transmission capacity of a single optical fiber can be increased in proportion to the number of WDM signal channels.

There are variations in the requirements for WDM systems. For example, the number of WDM channels may vary from several channels to about 100 channels, depending upon the system. Further, there may be a wide variations in wavelength spacing, perhaps from 1 nm or less to tens of nm. In applying WDM to a subscriber system, it is necessary to provide the components at low prices, and this is difficult if the components must be specially made. Accordingly, a WDM filter usable as an optical multiplexer and/or an optical demultiplexer for a variety of WDM systems is a key device.

Aside from communications systems, it has also been proposed to use WDM in the field of measurement, and the WDM filter is an important component also in this field.

FIG. 1 is a plan view of a first conventional WDM filter usable as an optical multiplexer and/or an optical demultiplexer. This WDM filter includes a pair of slab optical waveguides (planar optical waveguides) 2 and 4 and a plurality of optical waveguides (arrayed optical waveguides) 6 for connecting the slab optical waveguides 2 and 4. The arrayed optical waveguides 6 have different optical path lengths. More specifically, the arrayed optical waveguides 6 are formed so that for light having a specific wavelength, there is a phase difference of an integral multiple of $2\pi$ between any adjacent waveguides 6.

To demultiplex an optical signal, at least one input optical waveguide 8 is connected to the slab optical waveguide 2 on a side opposite to the side having arrayed optical waveguides 6 connected thereto, and a plurality of output optical waveguides 10 are connected to the slab optical waveguide 4 on a side opposite to the side having arrayed optical waveguides 6 connected thereto. Diffraction occurs in a diffraction grating including the optical waveguides 6, and as the result the input optical waveguide 8 and each output optical waveguide 10 are coupled together by a specific wavelength. Accordingly, when a multiplexed (WDM) optical signal is supplied to the input optical waveguide 8, the optical signals from different wavelength channels are respectively output to the output optical waveguides 10.

In the case of using this WDM filter as an optical multiplexer, optical signals from different wavelength channels are respectively supplied to the optical waveguides 10. The optical signals are then wavelength division multiplexed, and the resultant WDM optical signal is output from the optical waveguide 8.

FIG. 2 is a plan view of a second conventional WDM filter usable as an optical multiplexer and/or an optical demultiplexer. This WDM filter includes a slab optical waveguide 12 having end faces 12A and 12B, with a plurality of first optical waveguides 14 optically connected to the end face 12A, and a plurality of second optical waveguides 16 optically connected to end face 12B. That is, a first end portion of each second optical waveguide 16 is optically connected to end face 12B of the slab optical waveguide 12. A second end portion of each second optical waveguide 16 is directly connected to a reflecting element 18. Each second optical waveguide 16 has a substantially uniform width. To have the optical waveguides 16 and the reflecting elements 18 function substantially as a diffraction grating, the second optical waveguides 16 have different optical path lengths. More specifically, the optical waveguides 16 are formed so that there is a phase difference between adjacent second optical waveguide 16. The phase difference is an integral multiple of $2\pi$ between adjacent second optical waveguides 16 for reflected light having a specific wavelength reciprocating in the second optical waveguides 16. In this WDM filter, it is sufficient to provide a single slab optical waveguide 12, so that the size of the WDM filter can be made smaller than that of the WDM filter shown in FIG. 1.

In the case of using this WDM filter as an optical demultiplexer, one of the first optical waveguides 14 is used as an input port for a multiplexed symbol, and the others are used as output ports for demultiplexed signals. Conversely, in the case of using this WDM filter as an optical multiplexer, one of the first optical waveguides 14 is used as an output port for the multiplexed signal, and the others are used as input ports.

The WDM filter shown in FIG. 1 has a problem in that it tends to be large. The large size is due to the fact that the optical waveguides 6 must be long enough to generate the optical path length difference required for a diffraction grating and due to the fact that two slab optical waveguides 2 and 4 are required.

The WDM filter shown in FIG. 2 has a problem in that the manufacturing process for the reflecting elements 18 is complicated. For example, for each reflecting element 18 to provide a diffraction grating, it is necessary to carry out a complicated manufacturing process including plural exposures.

It has been proposed to use a simpler process to obtain each reflecting element 18, which simpler process includes the step of forming an end face on each second optical waveguide 16 perpendicular to the optical path (optical axis) of the second optical waveguide. Then, a reflection film is formed directly on the perpendicular end face. Although an end face can be obtained by etching, the etching step causes a substantial deterioration in the perpendicularity of the end face, particularly at edge portions of the end face. Such a deterioration in perpendicularity is partially due to the fact that, for example, the etching rate for silica glass, which may be used as the material of the second optical waveguides 16, is low.

The WDM filters shown in FIGS. 1 and 2 have a common problem in that they have characteristics which are dependent on temperature. That is, since the temperature coefficient of refractive index (refractive index temperature coefficient) of each optical waveguide 6 or 16 is not zero, multiplexing or demultiplexing on the order of $\mu$m is affected by temperature changes. As a result, the usable temperature range at which required characteristics can be obtained is narrow.

SUMMARY OF THE INVENTION

It is therefore an object of the present invention to provide an optical device suitable for use as a wavelength division multiplexing (WDM) filter, which device is smaller than conventional devices.

It is a further object of the present invention to provide an optical device suitable for use as WDM filter, which device is easier to manufacture than conventional devices.

It is a still further object of the present invention to provide an optical device suitable for use as a WDM filter, which device has a wider usable temperature range than conventional devices.

In accordance with a first aspect of the present invention, there is provided an optical device having a slab optical waveguide, a first optical waveguide, a plurality of second optical waveguides and a reflector. The slab optical waveguide has first and second ends. The first optical waveguide is optically connected to the first end of the slab optical waveguide. The plurality of second optical waveguides each have first and second guide bars with the first guide bars being optically connected to the second end of the slab optical waveguide and the second guide bars being optically connected to the first guide bars. The second guide bars have a width greater than that of the first guide bars. The reflector is optically connected to each of the second guide bars of the second optical waveguides.

In accordance with a second aspect of the present invention, there is provided a method of manufacturing an optical device having the steps of forming an optical waveguide structure, separately forming a plurality of second guide bars, forming an end face and forming a reflector. The optical waveguide structure is formed to have a slab optical waveguide and a plurality of first guide bars connected to the slab optical waveguide. The first guide bars respectively having optical axes. The plurality of second guide bars are optically connected respectively to the first guide bars. The end face is formed on each of the second guide bars substantially perpendicular to the optical axes of the respective first guide bars. The reflector is formed on the end face of each second guide bar.

In accordance with a third aspect of the present invention, there is provided an optical device having a slab optical waveguide, a first optical waveguide, a plurality of second optical waveguides and a reflector. The slab optical waveguide has first and second ends. The first optical waveguide is optically connected to the first end of the slab optical waveguide. The plurality of second optical waveguides respectively have first and second ends, the first ends of the second optical waveguides being optically connected to the second end of the slab optical waveguide. Each second optical waveguide has first and second guide bars connected in series. The first guide bars have a refractive index temperature coefficient different in sign from that of the second guide bars. The reflector is optically connected to the second end of each of the second optical waveguides.

In accordance with a fourth aspect of the present invention, there is provided an optical device having first and second slab optical waveguides and a plurality of optical waveguides provided between the first and second slab optical waveguides. The optical waveguides have different optical path lengths. Each of the optical waveguides has first and second guide bars connected in series. The first guide bars have a refractive index temperature coefficient different in sign from that of the second guide bars.

In accordance with a fifth aspect of the present invention, there is provided an optical device having a slab optical waveguide, a first optical waveguide, a plurality of second optical waveguides and a continuous polymeric block. The slab optical waveguide has first and second ends. The first optical waveguide is optically connected to the first end of the slab optical waveguide. The plurality of second optical waveguides each have first and second ends with the first end being optically connected to the second end of the slab optical waveguide. The continuous polymeric block substantially covers the second ends of all of the second optical waveguides.

In accordance with a sixth aspect of the present invention, there is provided a method of manufacturing an optical device having the steps of forming an optical waveguide structure and forming a continuous polymeric block. The optical waveguide structure is formed to include a slab optical waveguide and a plurality of optical waveguides having first and second ends. The first ends of the optical waveguides are optically connected to the slab optical waveguide. The continuous polymeric block is formed to substantially cover the second ends of all of the optical waveguides.

BRIEF DESCRIPTION OF THE DRAWINGS

The invention will now be described in more detail in connection with the attached drawings wherein.

DETAILED DESCRIPTION OF THE PREFERRED EMBODIMENT

The preferred embodiments of the present invention will be explained with reference to the accompanying drawings in which like reference indicators represent like elements.

Figure 3:
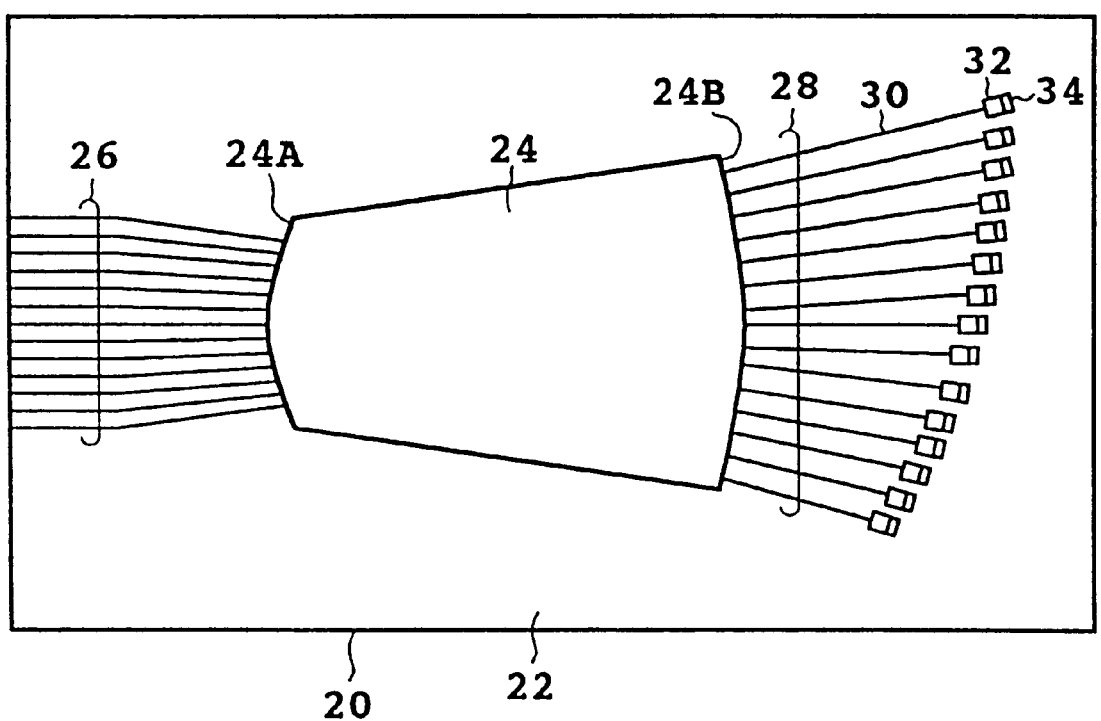
FIG. 3 is a plan view showing a first preferred embodiment of a WDM filter according to the present invention.
Figure 4:
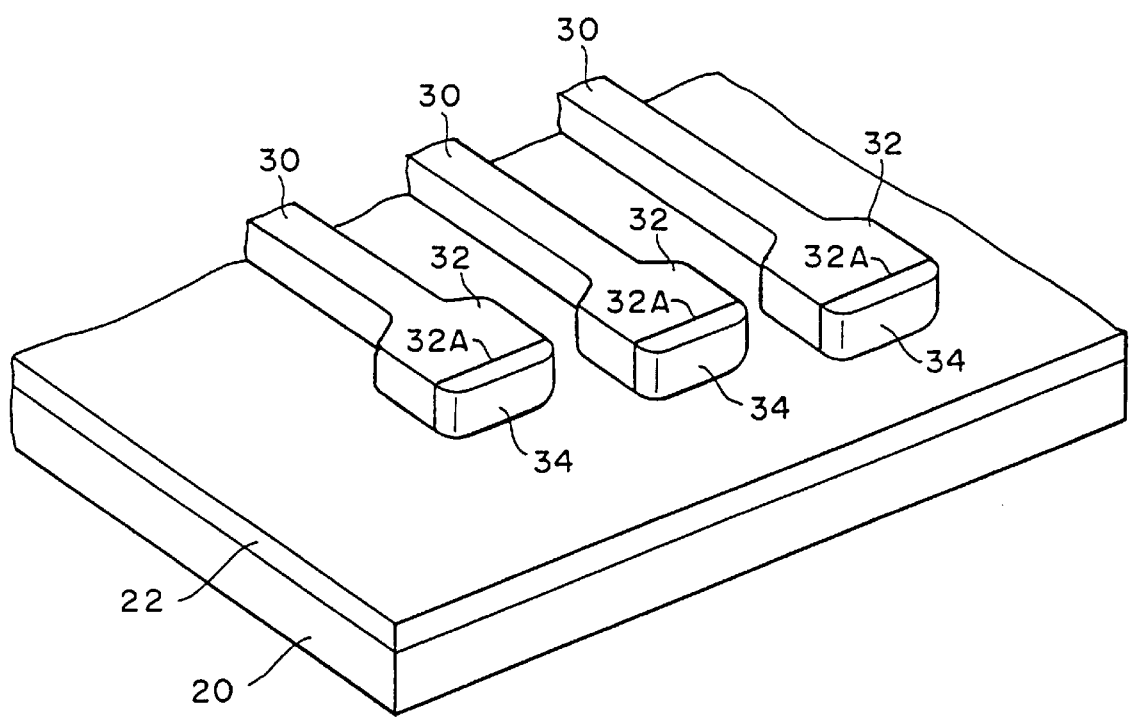
FIG. 4 is a fragmentary perspective view of an essential part of the WDM filter shown in FIG. 3.

FIG. 3 is a plan view showing a first preferred embodiment of a WDM (wavelength division multiplexing) filter according to a first preferred embodiment of the present invention, and FIG. 4 is a fragmentary perspective view of an essential part of the WDM filter shown in FIG. 3. A buffer layer 22 of $SiO_2$ doped with fluorine is formed on a substrate 20. The buffer layer 22 has a relatively low refractive index. An optical waveguide structure is obtained by a refractive index difference between the buffer layer 22 and a undoped $SiO_2$ layer formed on the buffer layer 22. A cladding layer (not shown) having a refractive index equivalent to that of the buffer layer 22 is provided on the undoped $SiO_2$ layer and the remaining exposed portions of the buffer layer 22. The optical waveguide structure includes a slab optical waveguide (planer optical waveguide) 24 having end faces 24A and 24B opposed to each other, a plurality of first optical waveguides 26 optically connected to the end face 24A of the slab optical waveguide 24, and a plurality of second optical waveguides 28 optically connected to the end face 24B of the slab optical waveguide 24. As mentioned above, each of the optical waveguides 24, 26, and 28 is formed of $SiO_2$ free from a dopant, and has a relatively high refractive index. The end faces 24A and 24B of the slab optical waveguide 24 are defined by boundary surfaces between the slab optical waveguide 24 and the cladding layer.

Each of the second optical waveguides 28 has of a first guide bar 30 having a first width (which is substantially uniform) and a second guide bar 32 having a second width larger than the first width. It should be noted that the guide bars are not necessarily restricted to any particular cross-sectional shape. Light travels in the first and second guide bars 30, 32 along optical axes thereof. The first guide bar 30 is optically connected to the end face 24B of the slab optical waveguide 24. In the preferred embodiment, each of the second optical waveguides 28 is straight and the second optical waveguides 28 are radially arranged.

Referring to FIG. 4, each of the second guide bars 32 has an end face 32A substantially perpendicular to the optical axis of the first guide bar 30 to which the second guide bar is optically connected. A reflector 34 of a metal film, for example, is formed on each end face 32A.

The second optical waveguides 28 have different optical path lengths so that the second optical waveguides 28 and the reflectors 34 function as reflection type diffraction gratings. More specifically, the optical path length difference between any two adjacent optical waveguides 30 is set to give a phase difference of an integral multiple of $2\pi$ for reflected light having a specific wavelength.

Each of the end faces 24A and 24B of the slab optical waveguide 24 forms a Rowland circle. Accordingly, one of the first optical waveguides 26 (an input/output) coupled to each of the other first optical waveguides (outputs/inputs) by respective specific wavelengths.

As will be hereinafter described, at least a part of each optical waveguide 28 may be curved so that the reflectors 34 are arranged in parallel. According to this preferred embodiment, the width of each second guide bar 32 is set to be larger than the width of each first guide bar 30, so that at least a part of each end face 32A (see FIG. 4) opposed to the corresponding first guide bar 30 can be made perpendicular to an optical path (optical axis) of the first guide bar 30, with a high degree of accuracy. If the width of each second guide bars 32 were equal to the widths of each first guide bars 30, an angular error could occur as a result of the etching process, at edge portions of the end faces 32A. That is, the edge portions could depart from the perpendicular. The angular error could be 5° or more because of the relatively low etching rate in $SiO_2$, which causes retraction of the edge of a mask member. To the contrary, by setting the width of the second guide bars 32 to be larger than that of the first guide bars, as in this preferred embodiment, at least the portion of each end face 32A opposed to the corresponding first guide bar 30 can have an angular error less than 1° or 2°, even if the edge portions of the end face 32A has an angular error of 5° or more. As a result, light reflected by the reflectors 34 can be highly efficiently directed back into the corresponding first guide bars 30.

In this preferred embodiment, there are seventeen first optical waveguides 26, and there are about eighty second optical waveguides 28. The width and height of each first guide bar 30 are both about 6 μm, and the width of each second guide bar 32 is about 21 μm. The length and height of each second guide bar 32 are about 15 μm and 6 μm, respectively. The optical path length difference between adjacent second optical waveguides 28 is about 100 μm. Accordingly, the size of the substrate 20 can be reduced to 15 mm×2.5 mm, for example, thereby providing a compact WDM filter.

Figure 5:
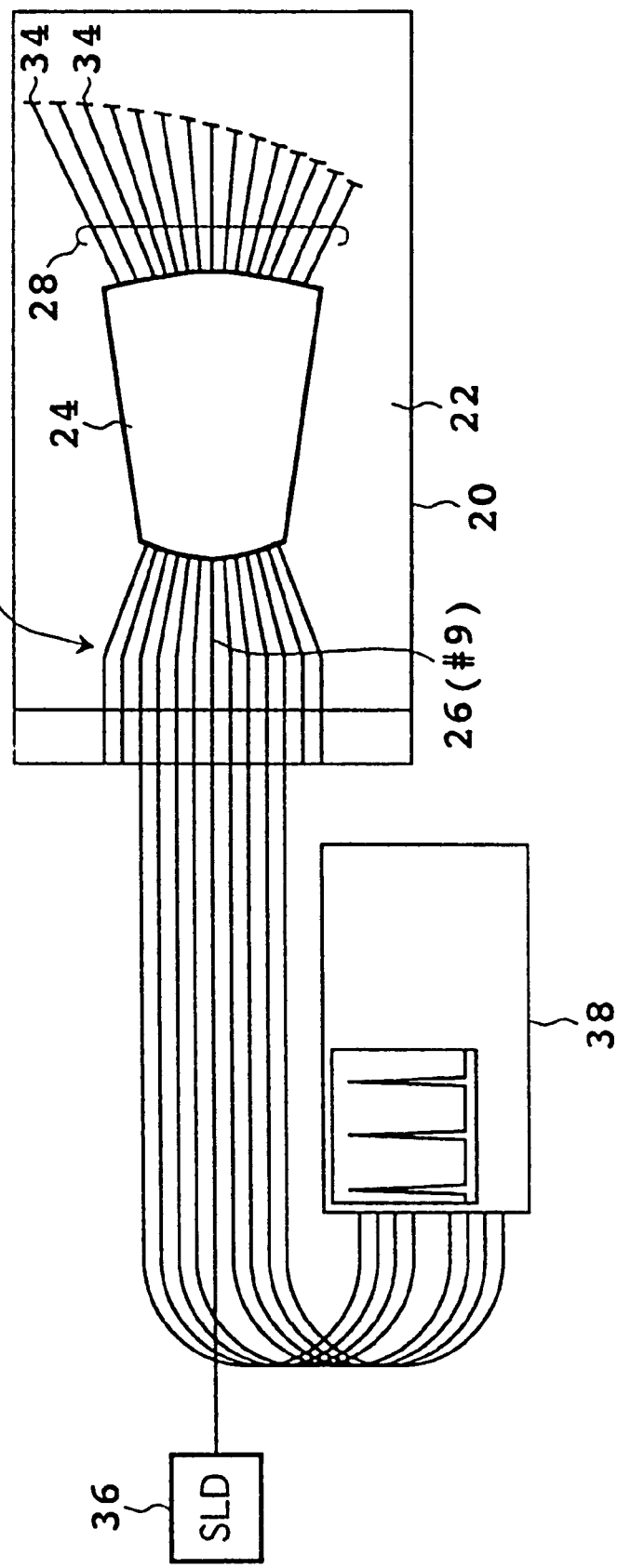
FIG. 5 is a schematic plan view showing a measuring system used with the WDM filter shown in FIG. 3.

The applicability of the WDM filter of the first preferred embodiment to an optical multiplexer and an optical demultiplexer will now be described with reference to FIGS. 5 through 7. FIG. 5 shows a measuring system used in an experiment for verifying the applicability of the first preferred embodiment.

In this measuring system, a central optical waveguide (#9) of the first optical waveguides 26 (#1 to #17) is connected to a super luminescent diode (SLD) 36 as a white light source. Some of the other first optical waveguides 26 (#1 to #8 and #10 to #17) are connected to an optical spectrum analyzer 38.

Light having a relatively wide band from the SLD 36 is introduced through the central optical waveguide (#9) into the slab optical waveguide 24. The light undergoes diffraction in the second optical waveguides 28 before and after reflection by reflectors 34. By the above-mentioned configuration of the optical waveguide structure, a plurality of narrow bands from the wide band of the light introduced by the central optical waveguide (#9) are individually coupled to the other first optical waveguides 26 (#1 to #8 and #10 to #17).

Figure 6:
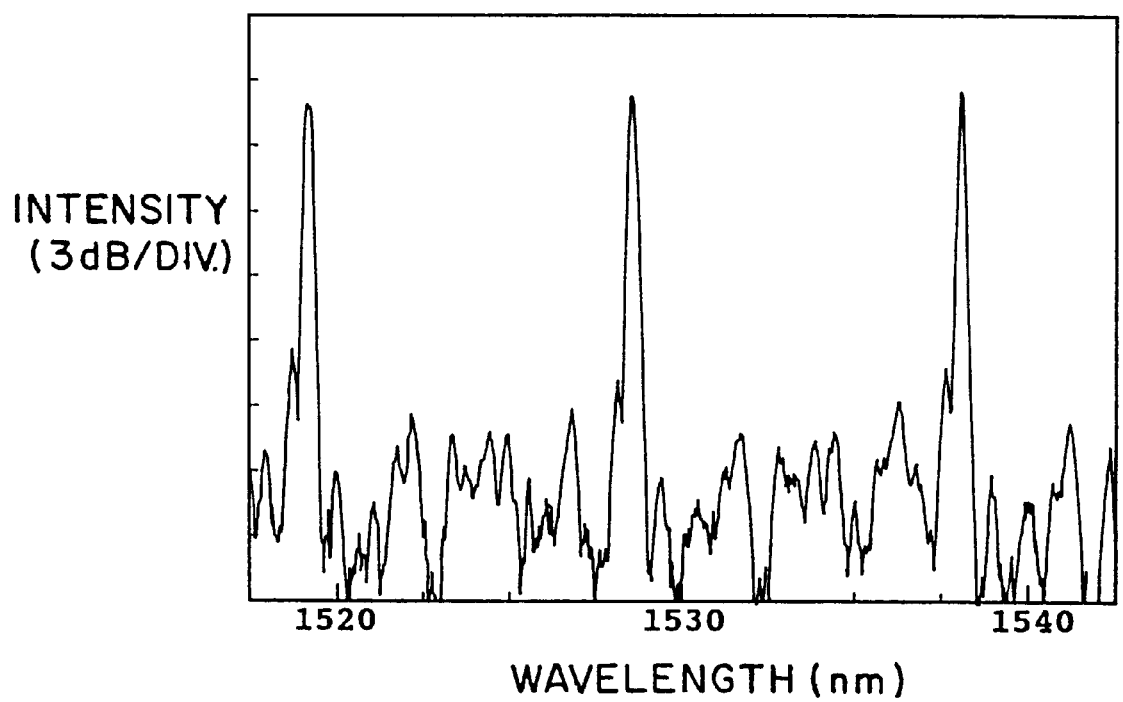
FIG. 6 shows a wavelength characteristic of light output from the measuring system shown in FIG. 5.

FIG. 6 shows a wavelength characteristic of light output from one of the other first optical waveguides 26 (#1 to #8 and #10 to #17) of the measuring system shown in FIG. 5. In FIG. 6, the vertical axis represents light intensity (3 dB/division) and the horizontal axis represents wavelength (nm).

It is apparent from FIG. 6 that light having a plurality of (three in this figure) narrow bands is output from this other optical waveguide 26. These spectra have periodicity in a limited range along the axis of wavelength.

Figure 7:
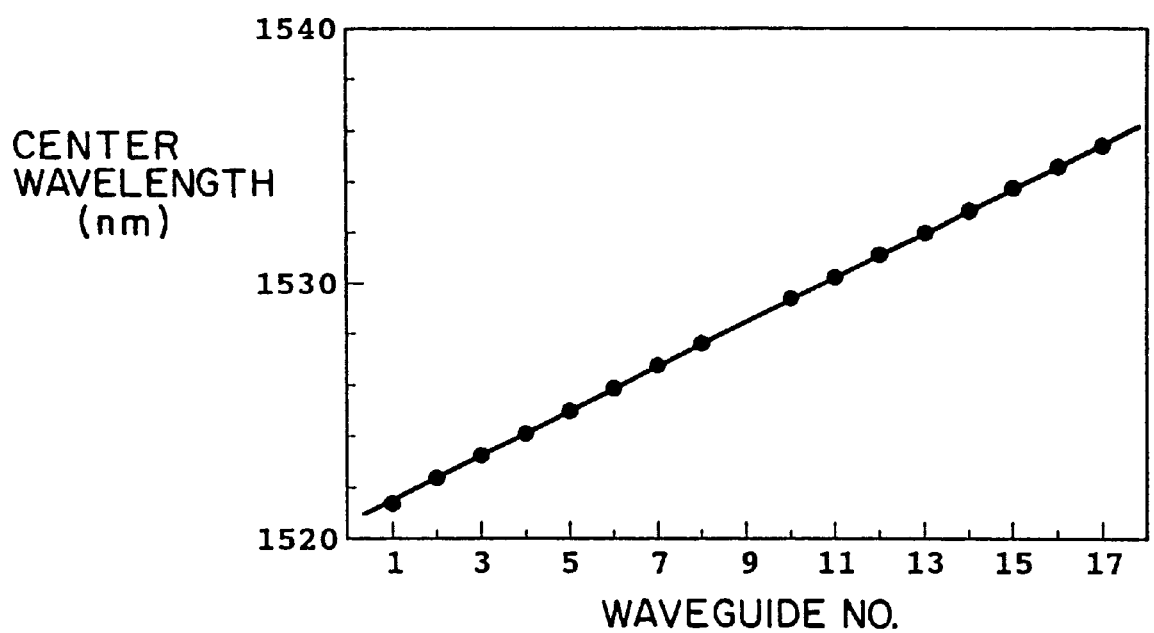
FIG. 7 shows the center wavelengths of light output respectively from the measuring system shown in FIG. 5.

FIG. 7 shows the center wavelengths of light output respectively from the other first optical waveguides 26 in the measuring system shown in FIG. 5. In FIG. 7, the vertical axis represents the center wavelengths (nm) of the output light and the horizontal axis represents the channel numbers (waveguide No.) of the first optical waveguides 26.

It is apparent from FIG. 7 that the center wavelength of the output light changes substantially linearly with the waveguide No. The free spectral range obtained was 0.86 nm, and the half width was 0.3 nm From the above experimental results, the applicability of the WDM filter according to the present invention to an optical multiplexer and an optical demultiplexer should be easily understandable for those skilled in the art.

Figure 8:
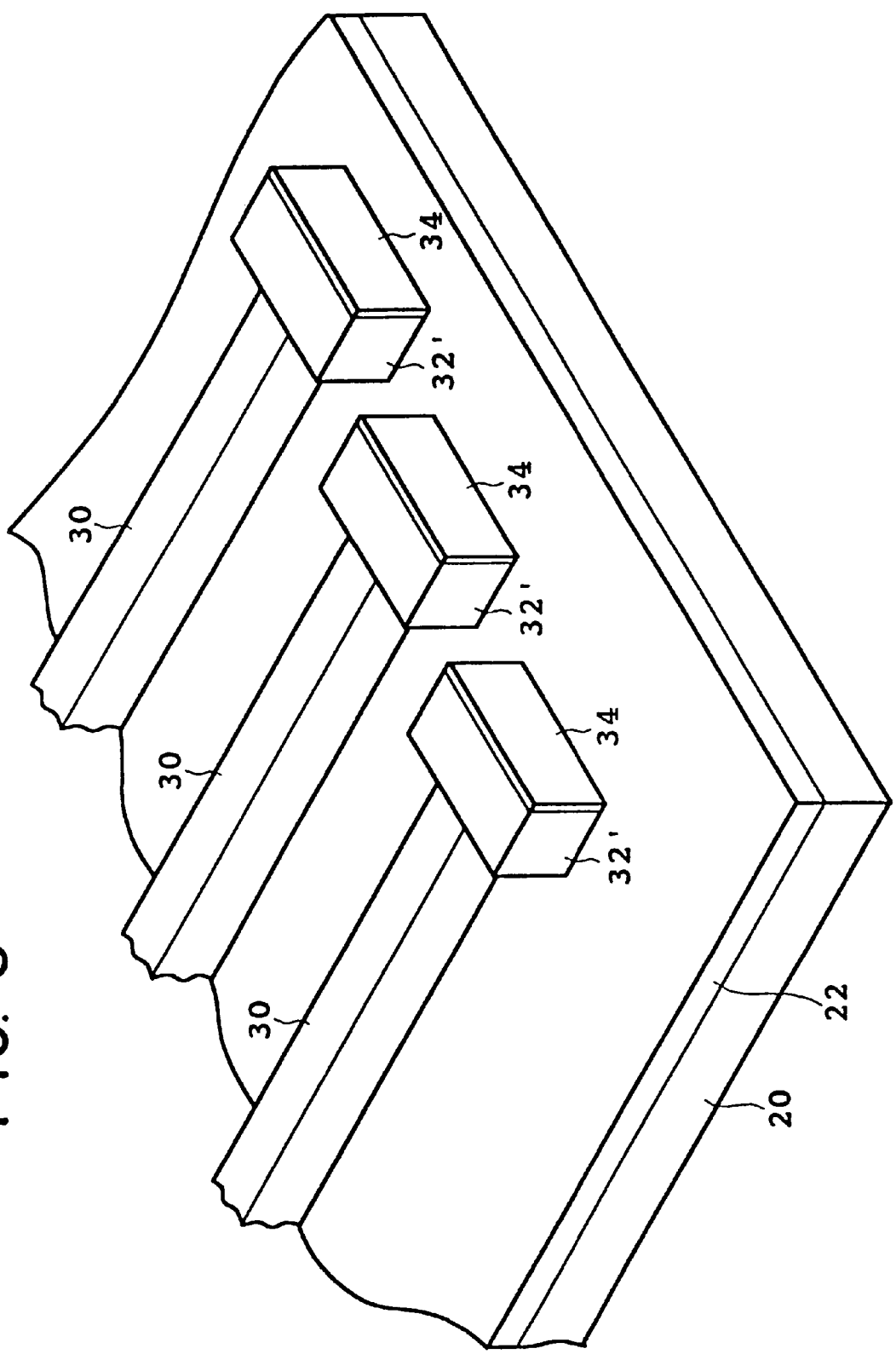
FIG. 8 is a fragmentary perspective view of an essential part of a WDM filter according to a second preferred embodiment of the present invention.

FIG. 8 is a fragmentary perspective view of an essential part of a WDM filter according to a second preferred embodiment of the present invention. In the first preferred embodiment shown in FIG. 4, each second guide bar 32 is integral with the corresponding first guide bar 30, whereas according to the second preferred embodiment, each second guide bar 32' is separate from the corresponding first guide bar 30.

The second preferred embodiment is similar to the first preferred embodiment in the provision of the slab optical waveguide 24, first and second optical waveguides 26, 28, etc. as shown in FIG. 3. Similar to the first preferred embodiment, the first guide bars 30 (of the second optical waveguides 28), the slab optical waveguide 24, and the first optical waveguides 26 are formed of glass (silica glass) composed mainly of silica ($SiO_2$). By using silica glass for the optical waveguide structure, the required refractive index and shape can be obtained, and polarization dependence can be eliminated.

In this preferred embodiment, each second guide bar 32' having a width greater than the width of each first guide bar 30 is formed of a polymeric material such as a polyimide or polysiloxane (silicone). Usually, the etching rate for a polymeric material is sufficiently faster than the etching rate for silica glass. Therefore, it is easier to form an end face on each second guide bar 32' for the reflector 34. That is, the perpendicularity of the end face on which the reflector 34 is to be formed can be easily attained.

The temperature coefficient for the refractive index ("refractive index temperature coefficient") of silica glass is usually positive. In contrast, the refractive index temperature coefficient of a polymeric material is usually negative. Accordingly, by combining silica glass first guide bars 30 and the corresponding polymeric second guide bars 32' refractive index temperature coefficients having different signs are combined to form the second optical waveguides 28. In this manner, changes in the optical path lengths within the second optical waveguides 28 due to temperature changes can be suppressed, thereby enabling a WDM filter having a wide usable temperature range. The absolute value of the refractive index temperature coefficient for polyimide may be about two orders of magnitude larger than the absolute value of the refractive index temperature coefficient for silica glass. Therefore, even if the length of each second guide bar 32' is about $\frac{1}{100}$ the length of each first guide bar 30, it is possible to suppress changes in the optical path length due to changes in temperature.

Figure 9A:
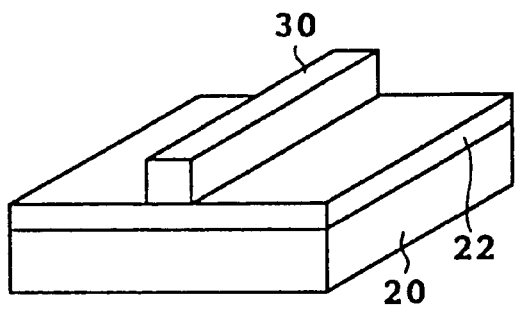
FIGS. 9(A) to 9(F) are perspective views showing a manufacturing process suitable for the WDM filter shown in FIG. 8.

FIGS. 9(A) to 9(F) are perspective views showing a manufacturing process suitable for the WDM filter of the second preferred embodiment. As shown in FIG. 9(A), a buffer layer 22 of $SiO_2$ doped with fluorine and having a relatively low refractive index is first formed on a Si substrate 20, and an $SiO_2$ layer undoped with fluorine and having a relatively high refractive index is formed on the buffer layer 22 by plasma chemical vapor deposition (CVD). Then, the undoped $SiO_2$ layer is partially removed by dry etching to thereby obtain first and optical waveguides 26 and 28 and a slab optical waveguide 24. In FIG. 9(A), only a first guide bar 30 (undoped $SiO_2$) of each second optical waveguide 28 is shown for simplicity of illustration.

Figure 9B:
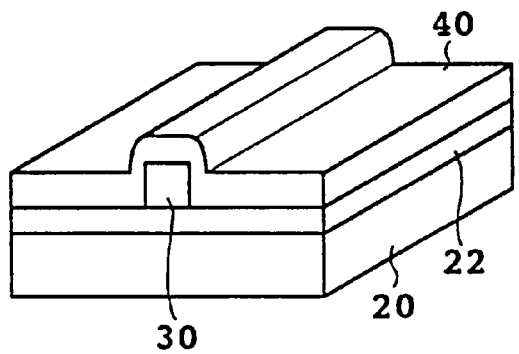

Next, as shown in FIG. 9(B), an overcladding 40 of $SiO_2$ doped with fluorine and having a relatively low refractive index is formed on the exposed buffer layer 22 and the first guide bar 30, by plasma CVD.

Figure 9C:
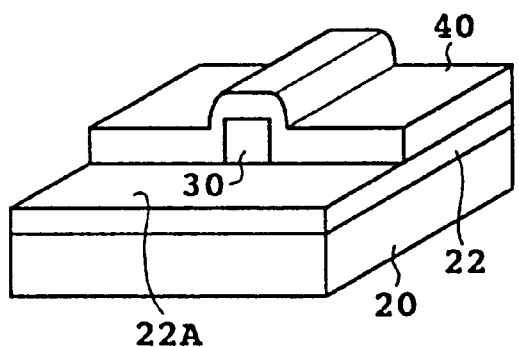

Next, as shown in FIG. 9(C), the first guide bar 30 and the overcladding 40 are selectively removed by dry etching to thereby partially expose an upper surface 22A of the buffer layer 22. In this case, the etching rate for $SiO_2$ forming the first guide bar 30 (undoped) and the overcladding 40 (doped) is low, so that it is difficult accurately form a perpendicular end face on the first guide bar 30 because the edge of a mask member used for etching retracts during etching. However, a highly accurate perpendicular end face on the first guide bar 30 is unnecessary according to several preferred embodiments of the present invention.

Figure 9D:
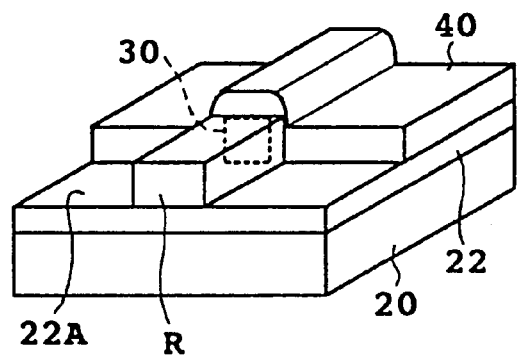

Next, as shown in FIG. 9(D), a block R of polymeric material is formed on the upper surface 22A of the buffer layer 22 so as to come into close contact with the end face of the first guide bar 30. The refractive index of the block R of polymeric material may be substantially equal to the refractive index of the first guide bar 30, even though the temperature coefficients therefor have opposite signs.

Figure 9E:
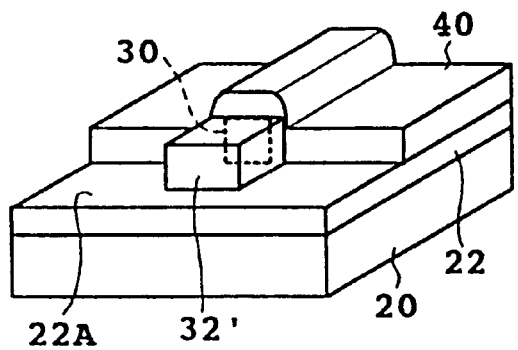

Next, as shown in FIG. 9(E), the block R of polymeric material is selectively removed by dry etching to thereby obtain a second guide bar 32' having a perpendicular end face. Since the etching rate for a polymeric material is sufficiently higher than the etching rate for $SiO_2$, the perpendicular end face of the second guide bar 32' is formed with very high accuracy.

Figure 9F:
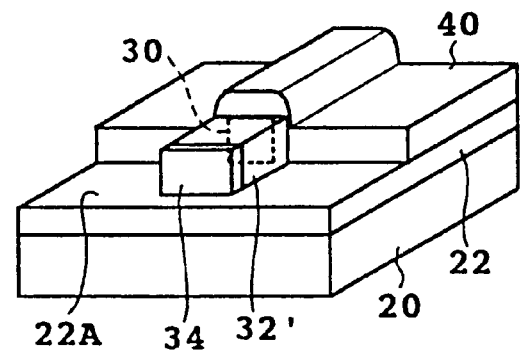

Finally, as shown in FIG. 9(F), a reflector 34 formed of a metal film, for example, is formed on the perpendicular end face of the second guide bar 32'. The metal film reflector 34 can be easily formed by vapor deposition or similar techniques. By selecting silver, copper, or a copper alloy as the material for the reflector 34, the reflectivity in a wavelength band of 1.55 $\mu$m can be improved.

According to this preferred embodiment, the second guide bar 32' may be wider than the first guide bar 30, and this is to ensure that at least the portion of the end face of the second guide bar 32' opposed to the first guide bar 30 is almost perfectly perpendicular. However, because the second guide bar 32' is formed of a polymeric material with a fast etching rate according to this preferred embodiment, the accuracy of the perpendicular end face is very good, even without the greater width. Hence, the present invention is not limited having the second guide bar 32' being wider than the first guide bar 30. In other words, the width of the second guide bar 32' may be substantially equal to the width of the first guide bar 30.

Figure 10:
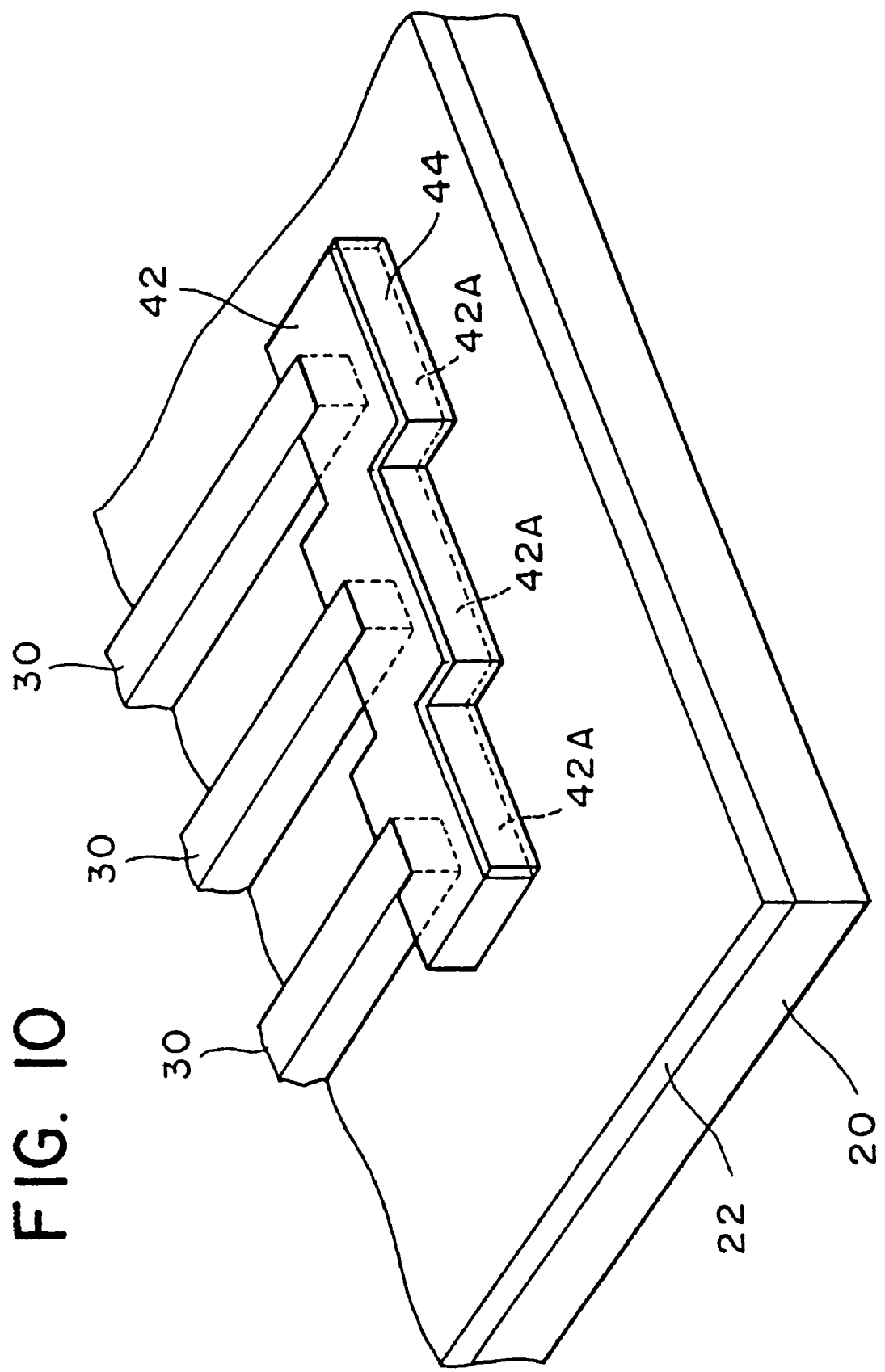
FIG. 10 is a fragmentary perspective view of a WDM filter according to a third preferred embodiment of the present invention.

FIG. 10 is a fragmentary perspective view of an essential part of a WDM filter according to a third preferred embodiment of the present invention. In contrast with the previous preferred embodiments in which a plurality of second guide bars 32 (32') are provided—one for each first guide bar 30, this third preferred embodiment uses a common second light conducting block 42 for the plural first guide bars 30. Like the second guide bars 32' of the second embodiment, the light conducting block 42 is formed of a polymeric material. In this embodiment, the light conducting block 42 is a continuous polymeric block.

The light conducting block 42 covers the end portions of all the first guide bars 30, and has a plurality of wall surfaces 42A correspondingly opposed to the end portions of the first guide bars 30. Each wall surface 42A is substantially perpendicular to the optical axis of the corresponding first guide bar 30.

The wall surfaces 42A are stepwise formed with the sizes of the steps corresponding to the length differences of the first guide bars 30. A metal film 44 is formed on the stepwise wall surfaces 42A to obtain reflectors corresponding to the first guide bars 30. Suitable polymeric materials for the light conducting block 42 include polyimides and polysiloxane.

Since the light conducting block 42 is formed of a polymeric material, the wall surfaces 42A can be accurately formed to be perpendicular, by etching. Also, similar to the second preferred embodiment the usable temperature range of the resulting WDM filter can be widened because of the temperature coefficients.

The WDM filter of the third preferred embodiment can be manufactured in accordance with the manufacturing process shown in FIGS. 9(A)–9(F) and therefore, a description of the manufacturing process therefor will be omitted.

Figure 11:
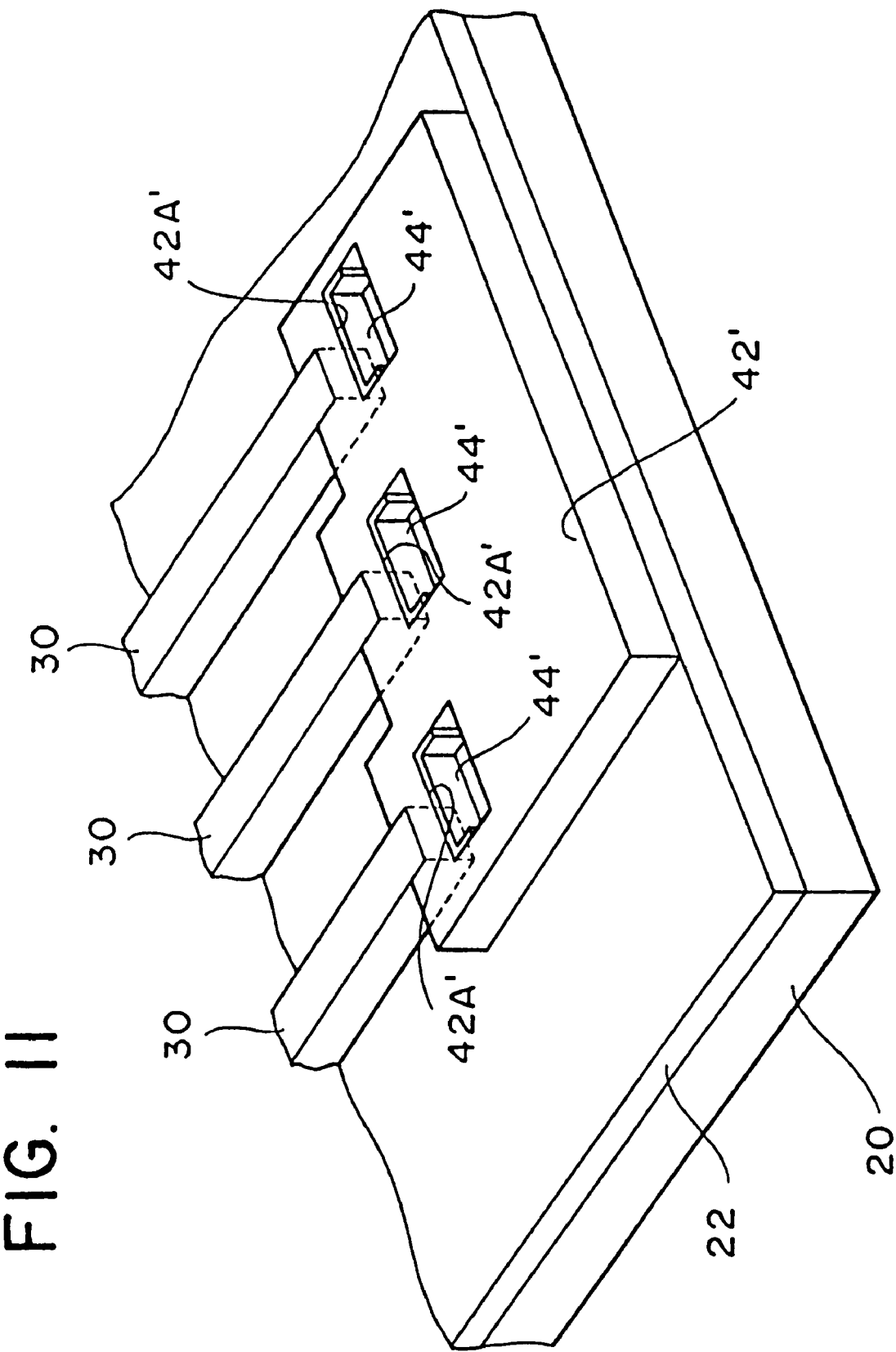
FIG. 11 is a fragmentary perspective view of an essential part of a WDM filter according to a fourth preferred embodiment of the present invention.

FIG. 11 is a fragmentary perspective view of an essential part of a WDM filter according to a fourth preferred embodiment of the present invention. In contrast with the previous preferred embodiments wherein the reflectors are formed on the outermost end faces of the second guide bars, (or light conducting block (continuous polymeric block)) according to the fourth preferred embodiment, a plurality of recesses are formed in a light conducting block 42' to thereby obtain a plurality of wall surfaces 42A'. The light conducting block 42' serves each of the plurality of first guide bars 30. The wall surfaces 42A' oppose corresponding end faces of the first guide bars 30, and a plurality of corresponding reflectors 44' are formed on the wall surfaces 42A'.

The light conducting block 42' is formed of a polymeric material. Therefore, the wall surfaces 42A' can be accurately formed by etching to be perpendicular. Further, since the light conducting block 42' is formed of a polymeric material which has a negative refractive index temperature coefficient, whereas the first guide bars 30 are formed of silica glass which has a positive refractive index temperature coefficient, the usable temperature range of the resulting WDM filter can be widened.

The fourth preferred embodiment allows the distance between each wall surface 42A' and the end face of the corresponding first guide bar 30 to be reduced while maintaining the strength of the light conducting block 42'. The reduced distance suppresses the light beams from the first guide bars 30 from spreading between the first guide bars 30 and the reflectors 44'. Therefore, reflectors 44' are more efficiently coupled to the corresponding first guide bars 30.

The WDM filter of the fourth preferred embodiment can be manufactured in accordance with the manufacturing process shown in FIGS. 9(A)–9(F) and therefore, the description of the manufacturing process will be omitted.

Figure 12:
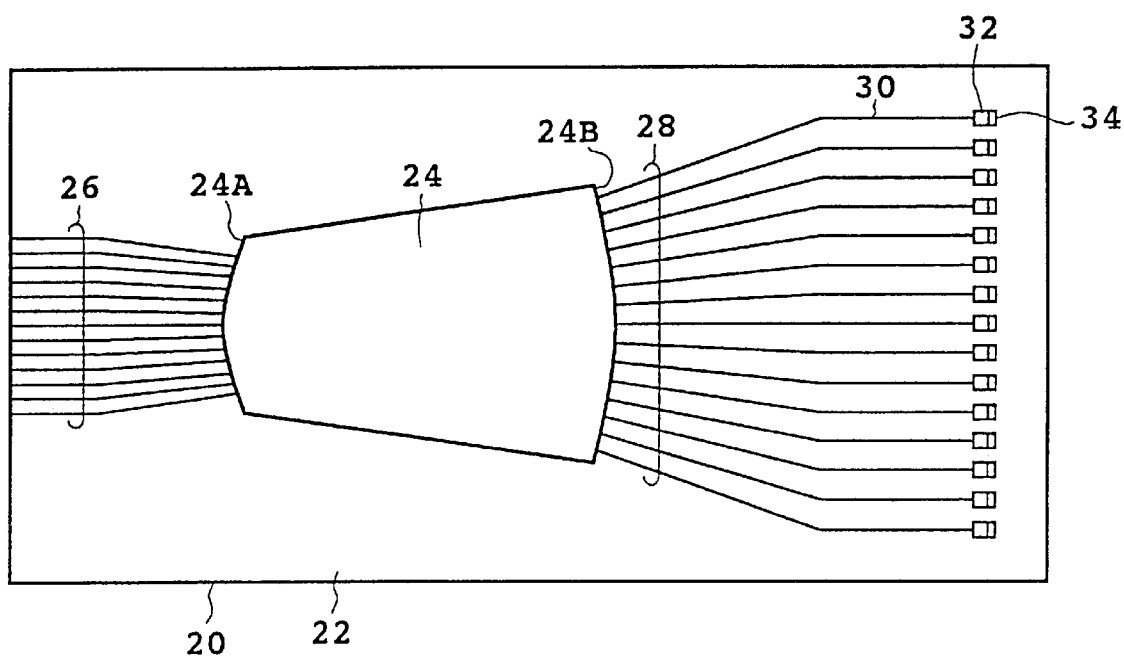
FIG. 12 is a plan view showing a WDM filter according to a fifth preferred embodiment of the present invention.

FIG. 12 is a plan view of a WDM filter according to a fifth preferred embodiment of the present invention. According to the fifth preferred embodiment, at least a portion of the second optical waveguides 28 is curved to make the reflectors 34 parallel to each other. More specifically, the first guide bars 30 are curved with a curvature gradually increasing from the slab optical waveguide 24 to the end faces thereof.

With this configuration, in the case that the etching process for forming the reflectors 34 has directionality, the substrate 20 can be optimally positioned for etching only by moving the substrate 20 stepwise along two axes on the sheet of FIG. 12.

Figure 2:
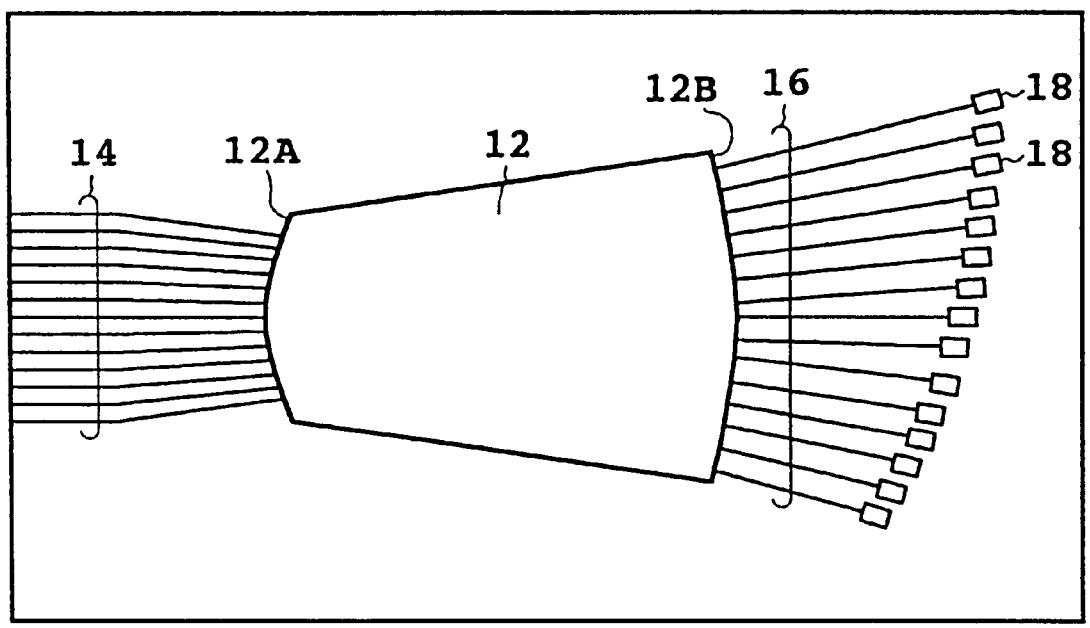
FIG. 2 is a plan view showing a second conventional WDM filter.
Figure 13:
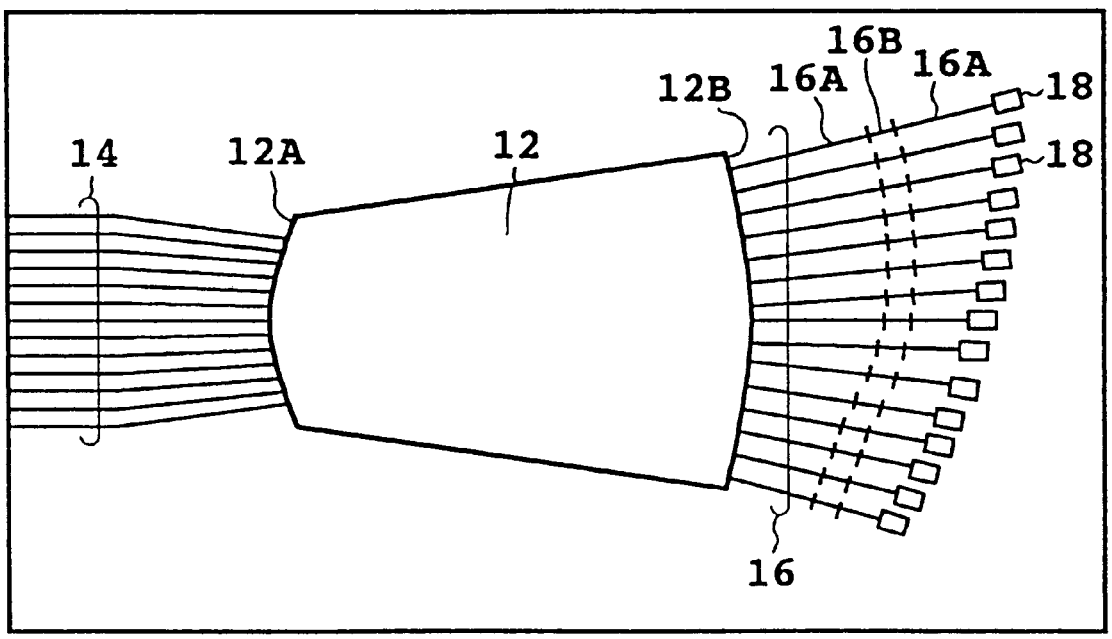
FIG. 13 is a plan view showing a WDM filter according to a sixth preferred embodiment of the present invention.

FIG. 13 is a plan view of a WDM filter according to a sixth preferred embodiment of the present invention. In contrast with the conventional WDM filter shown in FIG. 2, each second optical waveguide 16 in the sixth preferred embodiment is a two part structure having a first guide bar 16A having a first refractive index temperature coefficient, and a second guide bar 16B, having a second refractive index temperature coefficient different in sign from the first refractive index temperature coefficient.

Preferably, the absolute values of the first and second temperature coefficients and the shapes (lengths and areas, for example) of the first and second guide bars 16A and 16B are set so that the optical path length of each second optical waveguide 16 is substantially temperature independent.

For each second optical waveguide 16, the second guide bar 16B is shown as being in the middle of two first guide bar 16A segments. However, the second guide bar 16B may be provided at an end portion of each second optical waveguide 16.

Alternatively, a plurality of second guide bar 16B segments may be provided throughout the middle of each second optical waveguide 16, dispersed throughout first guide bar 16A segments. In this case, the length of the individual second guide bar 16A segments is reduced to result in a lower total scattering loss.

The first guide bars 16A, the slab optical waveguide 12, and the optical waveguides 14 are formed of silica glass, and the second guide bars 16B are formed of a polymeric material such as a polyimide and or polysiloxane, thereby allowing the above-mentioned different sign temperature coefficients and temperature independence. With this configuration, it is possible to provide a WDM filter with a small size and a wide usable temperature range.

Figure 1:
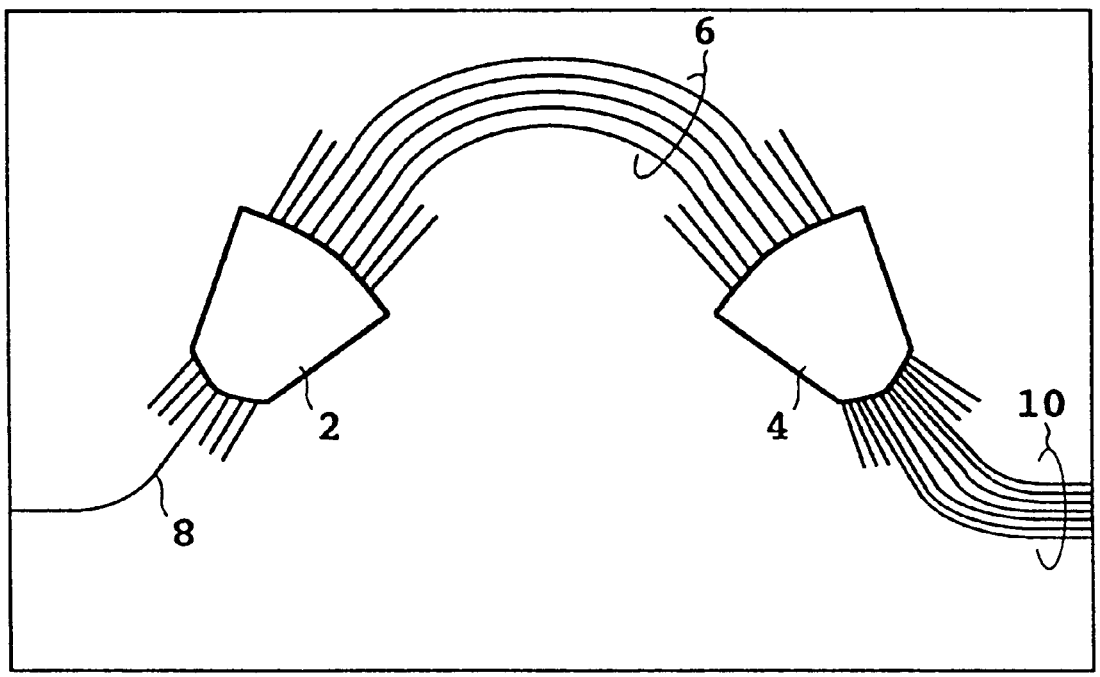
FIG. 1 is a plan view showing a first conventional WDM filter.
Figure 14:
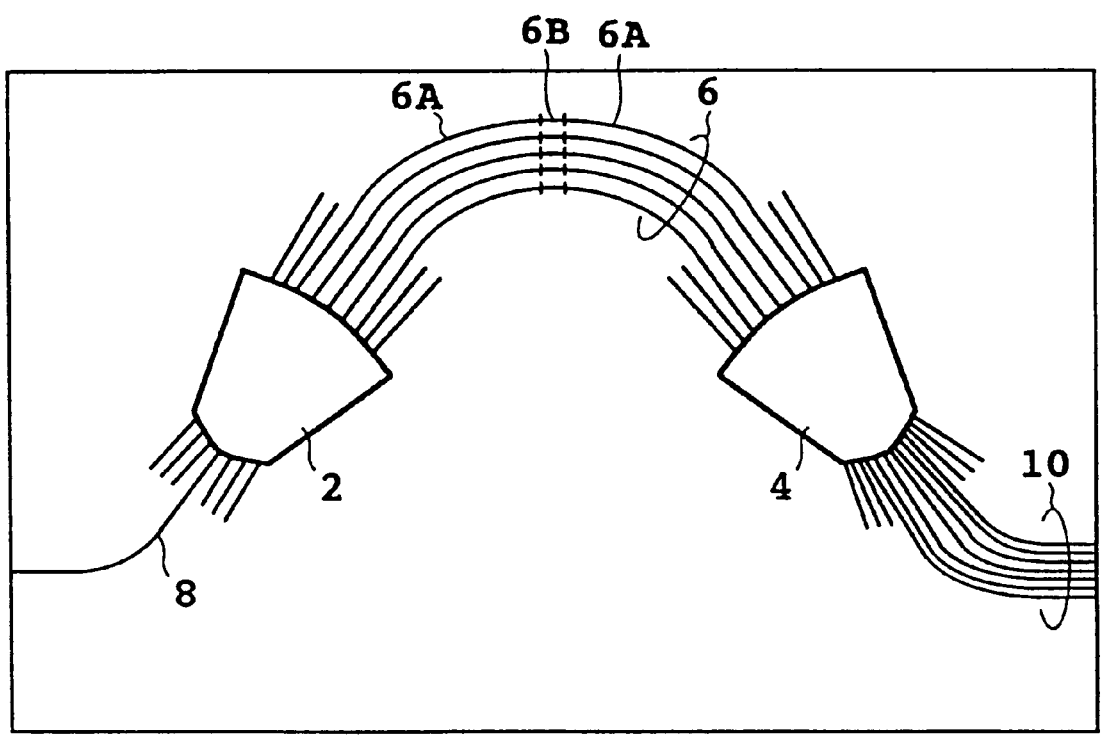
FIG. 14 is a plan view showing a WDM filter according to a seventh preferred embodiment of the present invention.

FIG. 14 is a plan view of a WDM filter according to a seventh preferred embodiment of the present invention. In contrast with the conventional WDM filter shown in FIG. 1, the seventh preferred embodiment has two part optical waveguides 6. That is, each optical waveguide 6 has a first guide bar 6A, having a first refractive index temperature coefficient, and a second guide bar 6B, having a second refractive index temperature coefficient different in sign from the first refractive index temperature coefficient.

Preferably, the absolute values of the first and second temperature coefficients and the shapes (lengths and areas, for example) of the first and second guide bars 6A and 6B are set so the path length of each optical waveguide 6 is substantially zero temperature independent.

For each optical waveguide 6, the second guide bar 6B is shown as being in the middle of two first guide bar 6A segments. However, the second guide bar 6B may be provided at an end portion of each optical waveguide 6.

The first guide bars 6A, the slab optical waveguides 2 and 4, and the input and output optical waveguides 8 and 10 are formed of silica glass, and the second guide bars 6B are formed of a polymeric material such as a polyimide or polysiloxane, thereby allowing the above-mentioned different sign temperature coefficients and temperature independence of refractive index. With this configuration, it is possible to provide a WDM filter with a wide usable temperature range.

As described above, according to at least some of the preferred embodiments of the present invention, an optical device and a manufacturing method therefor are provided, which device and method relate to a WDM filter which is smaller and easier to manufacture than conventional devices. At least some of the preferred embodiments provide an optical device and a manufacturing method therefor, which device and method relate to a WDM filter having a wide usable temperature range.

While the invention has been described in connection with the preferred embodiments, it will be understood that modifications within the principles outlined above will be evident to those skilled in the art. Thus, the invention is not limited to the preferred embodiments, but is intended to encompass such modifications.

What is claimed is:

1. An optical device comprising:
   a slab optical waveguide having first and second ends;
   a first optical waveguide optically connected to the first end of the slab optical waveguide;
   a plurality of second optical waveguides each having first and second guide bars with the first guide bars being optically connected to the second end of the slab optical waveguide and the second guide bars being optically connected to the first guide bars, the second guide bars having a width greater than that of the first guide bars; and
   a reflector optically connected to each of the second guide bars of the second optical waveguides.

2. An optical device according to claim 1, wherein the second guide bars are formed of a polymeric material.

3. An optical device according to claim 1, wherein the second guide bars are formed of a polyimide or polysiloxane.

4. An optical device according to claim 1, wherein the first and second guide bars are formed respectively of first and second materials, the first material having an etching rate greater than that of the second material.

5. An optical device according to claim 1, wherein the first guide bars are formed of silica glass.

6. An optical device according to claim 1, wherein
   the second guide bars have end faces, and
   the reflector is a metal film formed on the end faces of the second guide bars.

7. An optical device according to claim 6, wherein the metal film is formed of silver, copper, or a copper alloy.

8. An optical device according to claim 1, wherein the first guide bars have a refractive index temperature coefficient different in sign from that of the second guide bars.

9. An optical device according to claim 1, wherein the second optical waveguides have different optical path lengths.

10. An optical device according to claim 1, wherein at least a part of the second optical waveguides is curved so as to make the reflectors parallel to each other.

11. A method of manufacturing an optical device comprising the steps of:
    (a) forming an optical waveguide structure comprising a slab optical waveguide and a plurality of first guide bars connected to the slab optical waveguide, the first guide bars respectively having optical axes;
    (b) separately forming a plurality of second guide bars optically connected respectively to the first guide bars;
    (c) forming an end face on each of the second guide bars substantially perpendicular to the optical axes of the respective first guide bars; and
    (d) forming a reflector on the end face of each second guide bar.

12. A manufacturing method according to claim 11, wherein the second guide bars have a width greater than that of the first guide bars.

13. A manufacturing method according to claim 11, wherein the optical waveguide structure is formed of silica glass.

14. A manufacturing method according to claim 11, wherein the second guide bars are formed of a polymeric material, and step (c) includes the step of etching the polymeric material.

15. A manufacturing method according to claim 14, wherein the polymeric material is a polyimide or polysiloxane.

16. A manufacturing method according to claim 11, wherein step (a) include the step of etching at a first etching rate, and the step (c) includes the step of etching at a second etching rate greater than the first etching rate.

17. An optical device comprising:
    a slab optical waveguide having first and second ends;
    a first optical waveguide optically connected to the first end of the slab optical waveguide;
    a plurality of second optical waveguides respectively having first and second ends, the first ends of the second optical waveguides being optically connected to the second end of the slab optical waveguide, each second optical waveguide having first and second guide bars connected in series, the first guide bars having a refractive index temperature coefficient different in sign from that of the second guide bars; and
    a reflector optically connected to the second end of each of the second optical waveguides.

18. An optical device according to claim 17, wherein first and second temperature coefficients and the lengths of the first and second guide bars are set so that the length of the optical path of each of the second optical waveguides is substantially temperature independent.

19. An optical device according to claim 17, wherein
    each first guide bar is provided in two segments, and
    each second guide bar is provided in the middle of the segments of the first guide bar.

20. An optical device according to claim 19, wherein
    the first and second guide bars are both provided in segments, and
    for each second optical waveguide, the segments of the second guide bar are dispersively provided within the segments of the first guide bar.

21. An optical device according to claim 17, wherein the first guide bars are formed of silica glass, and the second guide bars are formed of a polymeric material.

22. An optical device comprising:
    first and second slab optical waveguides; and
    a plurality of optical waveguides provided between the first and second slab optical waveguides and having different optical path lengths, each of the optical waveguides having first and second guide bars connected in series, the first guide bars having a refractive index temperature coefficient different in sign from that of the second guide bars.

23. An optical device according to claim 22, further comprising:
- at least one input optical waveguide optically connected to the first slab optical waveguide; and
- a plurality of output optical waveguides optically connected to the second slab optical waveguide.

24. An optical device according to claim 22, wherein the first and second temperature coefficients and the lengths of the first and second guide bars are set so that the length of the optical path length of each of the optical waveguides is substantially temperature independent.

25. An optical device according to claim 22, wherein
each first guide bar is provided in two segments, and
each second guide bar is provided in the middle of the segments of the first guide bar.

26. An optical device according to claim 22, wherein the first guide bars are formed of silica glass, and the second guide bars are formed of a polymeric material.

27. An optical device comprising:
- a slab optical waveguide having first and second ends;
- a first optical waveguide optically connected to the first end of the slab optical waveguide;
- a plurality of second optical waveguides, each having first and second ends with the first end being optically connected to the second end of the slab optical waveguide; and
- a continuous polymeric block substantially covering the second ends of all of the second optical waveguides.

28. An optical device according to claim 27, wherein a plurality of wall surfaces are formed in the continuous polymeric block at positions opposing the second ends of all of the second optical waveguides, the device further comprising a reflector formed on each of the wall surfaces.

29. An optical device according to claim 28, wherein the wall surfaces are formed within recesses formed in the continuous polymeric block.

30. An optical device according to claim 27, wherein the continuous polymeric block is formed of a polyimide or polysiloxane.

31. An optical device according to claim 27, wherein each of the second optical waveguides has a first refractive index temperature coefficient, and the continuous polymeric block has a second refractive index temperature coefficient different in sign from the first refractive index temperature coefficient.

32. A method of manufacturing an optical device comprising the steps of:
(a) forming an optical waveguide structure including a slab optical waveguide and a plurality of optical waveguides having first and second ends, the first ends being optically connected to the slab optical waveguide; and
(b) forming a continuous polymeric block to substantially cover the second ends of all of the optical waveguides.

33. A method according to claim 32, further comprising the steps of:
(c) forming a plurality of wall surfaces in the continuous polymeric block at positions opposing the second end of all of the optical waveguides; and
(d) forming a reflector on each of the wall surfaces.

34. An optical device according to claim 32, wherein the wall surfaces are formed within recesses formed in the continuous polymeric block.

* * * * *